United States Patent [19]
Harris et al.

[11] 3,891,881
[45] June 24, 1975

[54] MAGNETIC POLES

[75] Inventors: John Derek Harris; Francis Roy Wood, both of Solihull, England

[73] Assignee: The Lucas Electrical Company Ltd., Birmingham, England

[22] Filed: Oct. 31, 1974

[21] Appl. No.: 519,543

Related U.S. Application Data

[63] Continuation of Ser. No. 356,058, April 30, 1973, abandoned.

[30] Foreign Application Priority Data

May 3, 1972 United Kingdom............... 20679/72

[52] U.S. Cl. .................. 310/218; 29/609; 336/234
[51] Int. Cl. ............................................. H02k 1/14
[58] Field of Search ............ 336/234, 233; 310/199, 310/216-218, 254-258, 259, 42; 79/609

[56] References Cited
UNITED STATES PATENTS

| 1,842,595 | 1/1932 | Erickson | 336/234 X |
| 2,498,702 | 2/1950 | Nahman | 336/234 X |
| 2,913,603 | 11/1959 | Carlson | 310/218 X |
| 3,339,132 | 8/1967 | Schafft | 310/216 X |

*Primary Examiner*—Donovan F. Duggan
*Attorney, Agent, or Firm*—Hill, Gross, Simpson, Van Santen, Steadman, Chiara & Simpson

[57] ABSTRACT

A magnetic pole comprising a strip of magnetic material which is corrugated and compressed to define a stack with adjacent convolutions thereof in facial contact. The convolutions at one end of the stack are longer than the remaining convolutions of the stack so that the longer convolutions define a pole shoe at one end of the pole while the remaining convolutions define a pole body.

4 Claims, 3 Drawing Figures

PATENTED JUN 24 1975        3,891,881

MAGNETIC POLES

This is a continuation, of application Ser. No. 356,058, filed Apr. 30, 1973, now abandoned.

This invention relates to magnetic poles.

A magnetic pole according to the invention comprises a strip of magnetic material corrugated and compressed to define a stack with adjacent convolutions thereof in facial contact the convolutions at one end of the stack being longer than the remaining convolutions of the stack so that the longer convolutions define a pole shoe at one end of the pole while said remaining convolutions define a pole body.

Conveniently at least some of the convolutions adjacent said one end of the stack are displaced laterally so that the pole is stepped adjacent said one end.

Desirably the convolutions are part cylindrical.

The invention further resides in a magnetic pole assembly including a pair of poles as specified in any one of the preceding paragraphs, a magnetic yoke assembly magnetically interconnecting the poles, and an electro-magnet winding through which an electric current is passed to generate a flow of magnetic flux in the assembly.

One example of the invention is illustrated in the accompanying drawings wherein.

Figure 1:
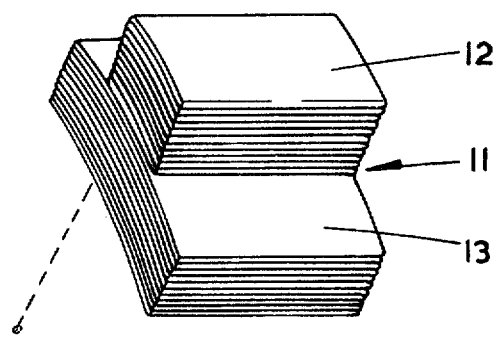
FIG. 1 is a perspective view of a magnetic pole.

Referring first to FIG. 1, the magnetic pole 11 is of generally T-shaped cross-section, and includes a pole body 12 having integral therewith a pole shoe 13, the pole shoe 13 being wider than the pole body 12. The pole 11 is formed from a single strip of mild steel which is initially corrugated, and then compressed longitudinally, so that the adjacent convolutions of the strip are pressed into facial contact with one another to define a stack. The width of the strip defines the depth of the finished pole, and the lengths of the corrugations adjacent one end of the strip are greater than the length of the corrugations adjacent the other end of the strip so that after compression of the strip the corrugations at said one end define the pole shoe 13, while the corrugations at the other end of the strip define the pole body 12. It will be appreciated that one corrugation intermediate the longer, and shorter corrugations will have a length between the shorter and longer lengths, so as to define the convolutiton at the junction of the pole shoe and the pole body.

Figure 2:
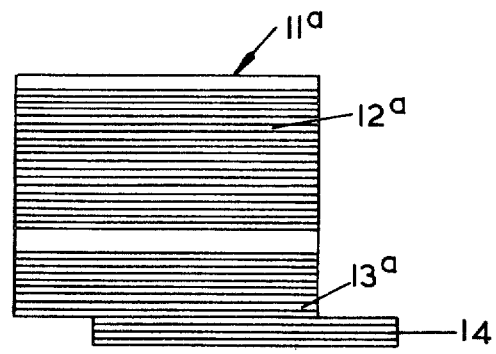
FIG. 2 is a side elevational view of a modification of the pole shown in FIG. 1.
Figure 3:
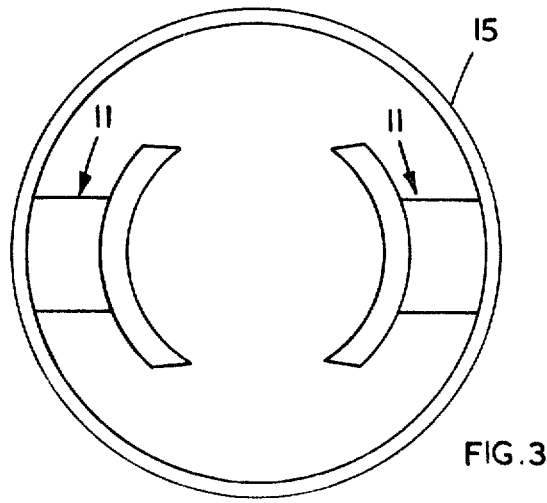
FIG. 3 is a diagrammatic representation of a magnetic pole assembly utilizing a pair of poles of the form shown in FIG. 1.

In the modified pole 11a shown in FIG. 2 a part 14 of the pole shoe 13a is displaced in the direction of the depth of the pole with respect to the remainder of the pole shoe 13a. This lateral displacement of the portion 14 is achieved by corresponding shaping of the strip from which the pole is formed. Thus adjacent the end of the strip which is to form the pole shoe 13a the strip includes a laterally displaced portion which when corrugated and compressed will constitute the portion 14 of the pole 13a. It will be appreciated, that the dimensions and shape of the stepped portion of the pole shoe can be varied to suit the intended application of the pole, by varying the form of the base strip from which the pole is produced.

Where the poles are to be used on the interior of a cylindrical component, for example a cylindrical yoke, then during corrugation and compression of the strip to form the pole the poles can be formed such that each convolution is part cylindrical, and the pole shoe thus presents a cylindrical, concave surface. For example, where the poles are intended for use in an electric motor, then the axis of curvature of the convolution of the poles will conveniently be the axis of rotation of the armature of the motor. The magnetic flux path through each of the poles will be towards or away from the pole shoe and so will be at right angles to the pole convolutions.

In one example, a pair of poles having the form described with reference to FIG. 1, or FIG. 2, are utilized in an electro-magnet. The two poles 11 are positioned diametrically opposite one another within a cylindrical yoke 15. The two poles are secured to the yoke 15, and the yoke 15 is formed from magnetic material and so magnetically interconnects the two poles. The two poles are shaped such that the radially innermost surfaces of their respective pole shoes define part of a common cylindrical surface having as its axis, the axis of the yoke 15. A shaft (not shown) extends co-axially through the yoke 15, and slidably mounted on the shaft is the armature of the electro-magnet. The pole assembly defined by the poles 11 and the yoke 15 have associated therewith an electromagnet winding (not shown) which may for example be wound around the yoke with the convolutions of the winding parallel to the axis of the yoke, or alternatively may be wound around one, or both of the pole bodies of the poles 11. When an electric current flows in the electromagnet winding then a flow of magnetic flux is generated in the pole assembly, which flows radially within one of the poles, from the yoke to the pole shoe, axially across the air gap between the pole shoe and the armature, generally diametrically within the armature, axially from the armature to the pole shoe of the other pole, radially within the other pole from the pole shoe to the yoke 15, and circumferentially around the yoke back to the first mentioned pole. Thus the armature will be moved axially along the shaft towards the pole shoes. In such an arrangement the pull exerted on the armature at different positions of the armature relative to the poles can be altered by stepping the pole shoes, for example as shown in FIG. 2 and by making consequential alterations to the shape of the armature. The flow of magnetic flux in the poles is again at right angles to the pole convolutions.

We claim:

1. A magnetic pole assembly comprising:

a pair of magnetic poles;

a magnetic yoke assembly interconnecting said poles;

an electromagnet winding through which an electric current is passed to generate a flow of magnetic flux in the magnetic pole assembly;

each of said poles being constructed of a single strip of magnetic material bent back and forth upon itself so that successive convolutions are interconnected to each other at opposite ends to define a stack of convolutions in face to face contact;

each of said poles being attached to said yoke assembly in such a manner that flux traveling from the yoke through the poles or vice versa travels substantially perpendicular to the plane of the convolutions of said poles.

2. The magnetic pole assembly of claim 1 wherein the convolutions at one end of the stack are longer than the remaining convolutions of the stack so that the longer convolutions define a pole shoe at one end of the pole while said remaining convolutions define a pole body.

3. The magnetic pole assembly of claim 1 wherein at least some of the convolutions adjacent said one end of the stack are displaced laterally so that the pole is stepped adjacent said one end.

4. The magnetic pole assembly of claim 1 wherein the convolutions are part cylindrical.

* * * * *